(12) United States Patent  
Doerr et al.

(10) Patent No.: US 11,768,839 B2  
(45) Date of Patent: Sep. 26, 2023

(54) AUGMENTING SEARCH RESULTS WITH USER-SPECIFIC INFORMATION

(71) Applicant: Microsoft Technology Licensing, LLC, Redmond, WA (US)

(72) Inventors: Anastasia C. Doerr, Kirkland, WA (US); Felix Gerard Torquil Ifor Andrew, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 407 days.

(21) Appl. No.: 16/872,987

(22) Filed: May 12, 2020

(65) Prior Publication Data

US 2020/0272633 A1 Aug. 27, 2020

Related U.S. Application Data

(63) Continuation of application No. 15/130,688, filed on Apr. 15, 2016, now Pat. No. 10,691,699.

(51) Int. Cl.
| | |
|---|---|
| *G06F 16/2457* | (2019.01) |
| *G06F 3/01* | (2006.01) |
| *G06F 16/248* | (2019.01) |
| *G06F 16/9535* | (2019.01) |
| *G06F 16/9537* | (2019.01) |

(52) U.S. Cl.
CPC ........ *G06F 16/24578* (2019.01); *G06F 3/011* (2013.01); *G06F 3/013* (2013.01); *G06F 16/248* (2019.01); *G06F 16/9535* (2019.01); *G06F 16/9537* (2019.01)

(58) Field of Classification Search
CPC .......... G06F 16/24578; G06F 16/9535; G06F 16/9537; G06F 16/248; G06F 3/011; G06F 3/013
See application file for complete search history.

(56) References Cited

U.S. PATENT DOCUMENTS

| | | | |
|---|---|---|---|
| 2007/0294225 A1* | 12/2007 | Radlinski | G06F 16/9535 |
| 2009/0204599 A1* | 8/2009 | Morris | G06F 16/90335 |
| | | | 707/999.005 |
| 2010/0174703 A1* | 7/2010 | Dandekar | G06F 16/9537 |
| | | | 707/E17.014 |
| 2011/0153428 A1* | 6/2011 | Ramer | G06Q 30/00 |
| | | | 705/14.64 |
| 2012/0158685 A1* | 6/2012 | White | G06F 16/9535 |
| | | | 707/723 |

(Continued)

*Primary Examiner* — Huawen A Peng  
(74) *Attorney, Agent, or Firm* — ARENTFOX SCHIFF LLP

(57) ABSTRACT

Techniques for augmenting or modifying ordered results include sending a search query to a location service, receiving ordered results responsive to the search query, and augmenting or modifying the search results based on user-specific information stored locally at a consumer computing device. The ordered results may be augmented by reordering a search result in the list of search results based on the user-specific information, and/or by graphically representing a location included in the ordered search results based on the user-specific information. The augmented search results may be presented on a display associated with the consumer computing device in a manner specific to a user of the consumer computing device.

17 Claims, 5 Drawing Sheets

(56) References Cited

U.S. PATENT DOCUMENTS

| | | | |
|---|---|---|---|
| 2012/0209840 A1* | 8/2012 | Gur | G06F 16/242 |
| | | | 707/E17.014 |
| 2012/0284256 A1* | 11/2012 | Mahajan | G06F 16/9537 |
| | | | 707/E17.014 |
| 2012/0310929 A1* | 12/2012 | Patterson | G06F 16/248 |
| | | | 707/E17.084 |
| 2014/0081943 A1* | 3/2014 | Gross | G06Q 30/0269 |
| | | | 707/706 |
| 2017/0090858 A1* | 3/2017 | Paris | G06F 16/638 |
| 2017/0091264 A1* | 3/2017 | Uszkoreit | G06F 16/3322 |
| 2017/0255862 A1* | 9/2017 | Li | G06F 16/9035 |

\* cited by examiner

AUGMENTING SEARCH RESULTS WITH USER-SPECIFIC INFORMATION

CROSS-REFERENCE TO RELATED APPLICATION

This application claims the benefit of U.S. Non-Provisional application Ser. No. 15/130,688, entitled "AUGMENTING SEARCH RESULTS WITH USER-SPECIFIC INFORMATION" and filed on Apr. 15, 2016, which is expressly incorporated by reference herein in its entirety.

BACKGROUND

Mapping services that provide directions to consumer computing devices have become commonplace today. For instance, many consumer computing devices include mapping services, such as map applications, which provide directions from one location to another location. These mapping services often return a list of search results or locations responsive to a user-submitted query so a user can select a desired destination from the list of search results. These mapping services rank the locations contained in the search results using the same criteria or information for all users of the mapping services. While some mapping services use crowd-sourcing to identify and return "popular" locations in the search results, these search results are uniform to all users and fail to take into account user-specific information or intent for search queries.

SUMMARY

This disclosure describes techniques for augmenting search results received from a mapping service (i.e., location service, search service, or search results service) using user-specific information to provide augmented or modified ranking and presentation of search results for a user. The techniques described herein include obtaining or accessing information stored local to a computing device associated with the user and augmenting search results received from a mapping service based on the information stored at the computing device of the user. For example, if a location included in the search results corresponds to a stored location that the computing device has been at previously, that location may be elevated in the search results. In some examples, the techniques may prevent private, sensitive information of the user from being shared with third parties. Additionally or alternatively, the techniques provide search results which may be more accurate in addressing a user's intent for a search query.

In some examples, user-specific information may be obtained by and accessed at a computing device of a user. The user-specific information may include location information, such as a location that the user navigated to using turn-by-turn directions, or a location that the computing device of the user was at for a period of time. In some examples, the user-specific information may comprise other data stored locally on the computing device of the user, such as emails, text messages, calendar appointments, or other data local to the computing device that may indicate a location of increased relevance to a user.

In some examples, augmenting the search results received from the mapping service may include reordering, or re-ranking, one or more of the search results based on the user-specific information. Additionally or alternatively, augmenting the search results may include graphically indicating at least one of the one or more locations included in the search results, such as by adding an icon representative of the location. In various examples, the user-specific information may be weighted based on the type of information. For instance, a location that is included in calendar information may be weighted more heavily than a location included in a text message. In various examples, the weighting values or factors applied to various locations based on the type of information may be "aged out" (i.e., the weight may be decreased over time). For instance, a location at which the computing device was located a year ago may have a reduced weighting factor applied to it compared to a location at which the computing device was a day ago.

The techniques described herein may improve the functioning of the computing device in various manners. For instance, the techniques include presenting search results from a mapping service in manner that more closely matches individual user intent. Rather than simply presenting results from a mapping service that are ordered or ranked using information gathered from all of the users of the mapping service, the techniques described herein augment the search results using user-specific information to present the results in a manner that is more closely in line with the intent of an individual user. By presenting augmented search results for an individual user, screen space on a display may be more efficiently utilized by presenting the most relevant results for the user, rather than having the user scroll down to view the right results or miss the right results altogether due to limited screen space. Additionally, by storing the user-specific information local to a computing device of the user, private and sensitive information of the user is kept private, rather than being shared with third parties. Further, storing the user-specific information locally may improve the functioning of the computing device because the computing device does not have to send the user-specific information to the mapping services, but still gains the benefit of having the user-specific information used to augment search results. These techniques may save processing power, bandwidth requirements, and battery power by not having to send data to mapping services remote from the computing device. Thus, the techniques described herein may provide more efficient use of limited display size of screens, and may reduce processing, bandwidth, and power requirements of the computing device by not requiring the computing device to send user information to remote mapping services.

This Summary is provided to introduce a selection of techniques in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
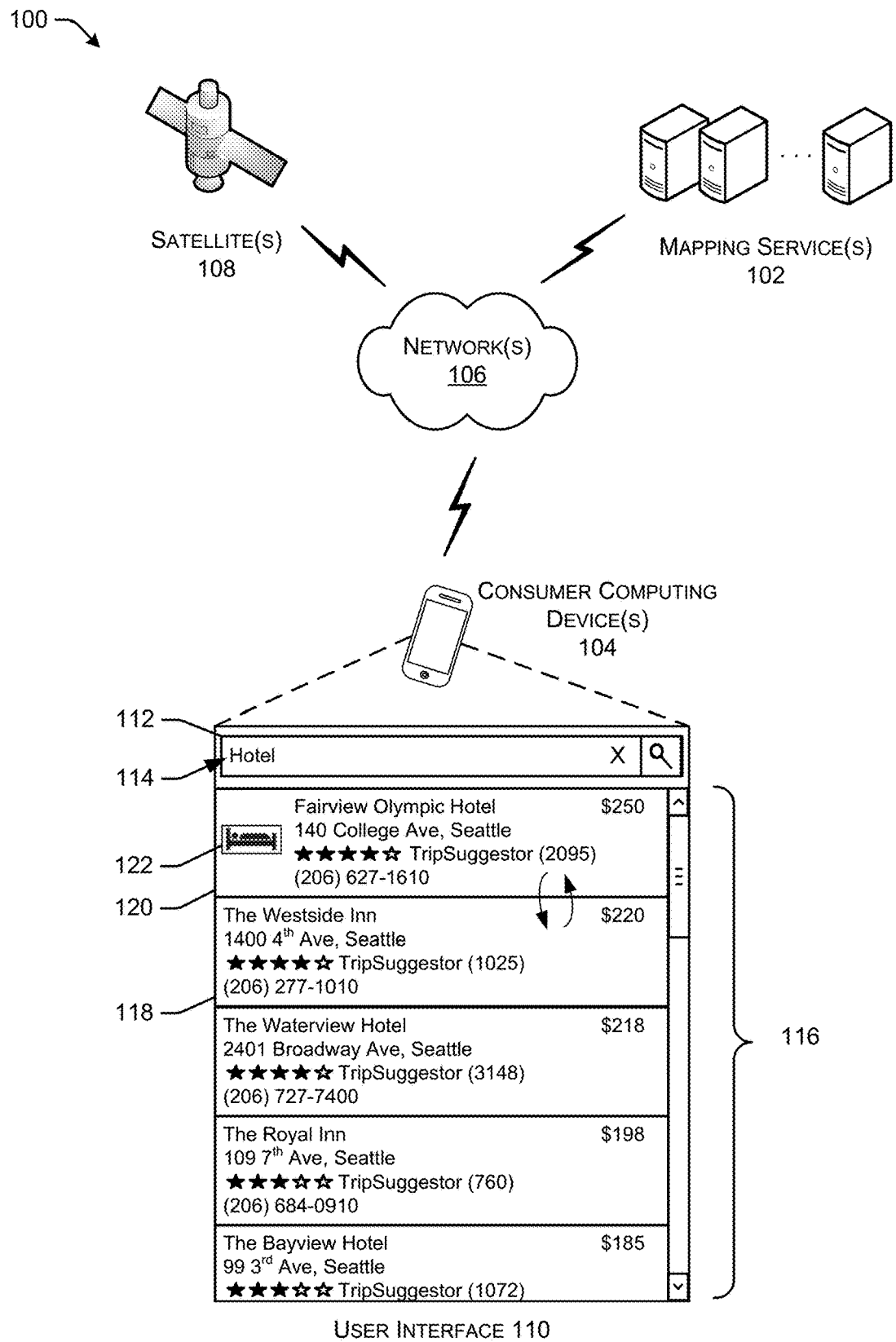
FIG. 1 is a schematic diagram showing an example environment for augmenting ordered search results at a consumer computing device received from a mapping service remote from the consumer computing device.

This disclosure describes techniques for augmenting search results received from a mapping service. In some examples, the search results may be received from a mapping service (e.g., BINGO Maps, GOOGLE® Maps, HERE MAPS®, WAZE®, SCOUT®, MapQuest®, Garmin®, Tom Tom®, etc.) located remote from a consumer computing device (i.e., computing device, client computing device, etc.). The search results may be ordered by the mapping service and may be augmented at the consumer computing device using user-specific information. In some examples, augmenting the search results may comprise reordering one or more of the search results based on the user-specific information. Additionally or alternatively, augmenting the search results may comprise graphically indicating, such as with an icon or text, locations include in the search results based on the user-specific information.

By augmenting the results locally at the consumer computing device, private information of the individual may be used to augment the results based on intent of the user and may remain private, rather than being shared with a third party mapping service. For purposes of this discussion, search results received from a mapping service include locations, businesses, or other results that are responsive to a search query submitted to the mapping service. For example, a user of the consumer computing device may search the word "hotel," and various hotels and their locations may be returned by the mapping service. The techniques described herein include sending, from a consumer computing device, a search query to a mapping or location service, receiving, from the location service, search results including locations responsive to the search query, augmenting the search results locally at the consumer computing device, and presenting the augmented search results on a display associated with the consumer computing device.

In various examples, the consumer computing device may include one or more mapping applications or services. The mapping application may present a user interface on a display of the consumer computing device that includes a search box to receive a search query. In response to a user entering a search query and/or additional input, such as selecting a search function, the mapping application may send the search query to a mapping service located remotely from the consumer computing device. The consumer computing device may receive search results from the mapping or location service which are responsive to the search query. For instance, a search query for "parks" may result in locations of various parks near the user's current location being received from the location service. The search results received from the mapping service may be ordered, or ranked, based on information obtained from all users of the mapping service. For example, the mapping service may identify which parks are most often selected or visited or most highly rated by other users of the mapping service and provide ordered results based on those selections or ratings. However, such "popular" results may not necessarily be the most helpful or relevant to a particular user.

The techniques described herein include augmenting, or modifying, search results received from a mapping service based on information that is associated with, or specific to, a user of the consumer computing device. In some examples, augmenting the search results may include reordering one or more of the search results based on the user-specific information. For example, the search results may have parks listed by the most popular parks selected by all of their users, but the results may be augmented to move a park visited by a user of the consumer computing device higher in the list or rankings. In this way, rather than presenting a list of parks the user is not personally interested in or familiar with, a favorite park of the user may be elevated on the list based on the consumer computing device having visited there recently. In an example scenario, a user may have stayed at a particular hotel one night, and the next day they leave the hotel to attend a meeting. After the meeting, the user may then search for "hotel" using a mapping service on their consumer computing device. In the past, the user would be given a list of hotels closest to the meeting location that may be the most "popular" selection by other users of the mapping service. However, with this invention the search results are augmented at the consumer computing device and the hotel the user stayed at last night may be listed first, even though it is further away. In some examples, augmenting or modifying the search results may further include adding a search results to the search results received from the mapping service. For instance, the hotel the user stayed at the night before may not have been included in the search results received from the mapping service. However, based on the user staying at the particular hotel the night before, the hotel may be added to the list of results received from the mapping service.

In various examples, augmenting the search results may additionally or alternatively include graphically indicating a result in the search results based on the user-specific information. In some examples, an icon or other graphical representation may be associated with a location returned in the search results to indicate that the result is associated with the user-specific information stored at the consumer computing device. As an example, a hotel that the consumer computing device was recently at may have an icon of a bed or a hotel to illustrate to the user that they were at this hotel in the past.

The user-specific information may comprise various types of information, such as explicit indicators (e.g., photo taken of a park the user wishes to visit later), implicit indicators (e.g., gaze tracking to identify a location the user wishes to visit based on length of gaze), calendar information (e.g., future and/or past appointments in a calendar with associated locations), direction information (e.g., previous navigation to a location using turn-by-turn directions, previous navigation without using turn-by-turn directions, etc.), previous location information (e.g., locations the consumer computing device has previously been at), email or text message information (e.g., locations, buildings, or other locales contained in emails and/or text messages on the consumer computing device), and contact information (e.g., locations of contacts stored in the consumer computing device). The information may be stored locally at the consumer computing device to prevent private information from being shared with third party services. As noted above, the various types of user-specific information may be used to augment the search results. For example, if an email on the consumer computing device included a confirmation email from a particular car rental company, then a list of search results responsive to the search query "car rental" may be augmented to have the particular car rental company elevated in the order of the search results.

In some examples, the various types of user-specific information may be weighted, or have weighting factors (i.e., weighting values) applied to them relative to other types of user-specific information when ranking search results. For example, explicit indications received from the user of the computing device may have a heavier weighting factor applied to them compared to contact information as explicit indicators may be stronger evidence that a user of the consumer computing device intends to visit the location explicitly indicated. In this way, some results may have higher weighting factors applied to them, and therefore may have more movement up or down in the list of search results. Additional description of the types of user-specific information and weighting factors is described with respect to FIG. 3 below.

In various examples, weighting factors associated with different user-specific information types may be reduced based on time, or "aged out." For example, if the consumer computing device had been at a particular hotel a day ago, that hotel location may have a weighting factor that is reduced less than a weighting factor applied to a hotel location that the consumer computing device had been at a year ago. In some examples, different types of the user-specific information may have their weighting factors reduced, or aged out, more or less depending on the type of the information. For example, an explicit indicator, such as a picture of a hotel the user wants to stay at, may be aged out more slowly over time than a hotel the user had been to for 10 minutes a year ago.

The techniques described herein further include presenting the augmented search results on a display associated with the consumer computing device. In an example where a search result has been elevated in the list of search results based on the user-specific information, the search result may be presented on the display higher on the list of search results. In some examples, a search result may be augmented with a graphical indicator, such as an icon, which may be presented along with the search result on the display of the computing device. In various examples, the icon or indicator may be representative of the user-specific information used to reorder or re-rank the result (e.g., calendar information, previous location information, etc.). In some examples, the icon may be representative of other information (e.g., the date the consumer computing device was last at the location, people at the location, etc.).

Illustrative Environments

FIG. 1 is a schematic diagram showing an example environment 100 for augmenting ordered search results including one or more locations responsive to a query. The example environment 100 can include one or more mapping services 102, one or more consumer computing devices 104, one or more networks 106, and one or more satellites 108.

The mapping service(s) 102 can be any entity, server(s), platform, computing device, or combination of computing devices that perform mapping and location services (e.g., BING® Maps, GOOGLE® Maps, WAZE®, SCOUT®, MapQuest®, Garmin®, Tom Tom®, etc.). In some examples, mapping service(s) 102 may serve as a repository for storing directions and/or locations. Mapping service(s) 102 may receive search queries from various end-user computing devices, such as consumer computing device(s) 104, and identify directions or locations that are responsive to the query. For example, mapping service(s) 102 may receive a query for "hotels" and search for locations responsive to the query, such as a list of hotels. In some examples, mapping service(s) 102 may identify a current location of the consumer computing device that sent the search query, and identify various hotels responsive to the query near that current location. In some examples, the searching and locating functions may be performed by separate entities (e.g., BINGO maps could search GARMIN® map databases). In various examples, mapping service(s) 102 may store feedback from other users of the service and provide ordered results based on the feedback from the other users of the service. For example, mapping service(s) 102 may track what hotels near the consumer computing device are most often selected by users of the mapping service(s) 102, or have the highest ratings from various rating services (e.g., TRIPADVISOR®, KAYAK®, etc.), and present ordered results based on the information collected from all users of the mapping service(s) 102 and/or the rating services. Mapping service(s) 102 may send the ordered results to the requesting consumer computing device, thereby providing results responsive to the search query based on information collected from all users of the mapping service(s) 102 (i.e., "crowd-sourced" information).

In some examples, mapping service(s) 102 may receive search queries from consumer computing device(s) 104, and send ordered search results responsive to the queries, via network(s) 106. The network(s) 106 may comprise any one or combination of multiple different types of networks, such as cellular networks, wireless networks, Local Area Networks (LANs), Wide Area Networks (WANs), Personal Area Networks (PANs), the Internet, or any other type of network configured to communicate information between computing devices.

Consumer computing device(s) 104 may comprise any type of end-user computing device storing one or more modules configured to augment ordered search results based on user-specific information. In some examples, consumer computing device(s) 104 may present a user interface 110 configured to receive input from a user on a display associated with consumer computing device(s) 104. User interface 110 may include a search query box 112 to receive a search query 114, such as "hotel," from a user of consumer computing device(s) 104. The search query may be input by any means, such as text, touch, voice, etc. The consumer computing device(s) 104 may send the search query 114, via network(s) 106, to mapping service(s) 102. Additionally, consumer computing device(s) 104 may receive ordered results 116 from the mapping service(s) 102 and via network(s) 106.

As shown in FIG. 1, ordered results 116 may be presented in user interface 110 according to the order or rank determined by mapping service(s) 102. In some examples, consumer computing device(s) 104 may store user-specific information, described in more detail in FIGS. 2 and 3, and use the user-specific information to augment the ordered results 116. In one illustrative example, ordered results 116 may comprise a list of hotels responsive to search query search query 114. A first result 118 may initially be listed as the first result in ordered results 116 and, based on the user-specific information, a second result 120 may be elevated to a higher position, as shown in FIG. 1. For example, the second result 120 may be a hotel that a user of consumer computing device(s) 104 stayed at the night before, whereas the first result may be the most popular hotel based on information collected from all users of mapping service(s) 102. By augmenting (i.e., reordering) the results, the user of consumer computing device(s) 104 may have results presented in a manner personalized to them and most in line with the user's actual intent (i.e., finding the hotel they stayed at the night before). In some examples, the user interface 110 may include a control usable to toggle between the ordered results 116 and the augmented results. Additionally or alternatively, the ordered results 116 may be augmented by having graphical indicators, such as icons, associated with individual results. In the illustrated example, second result 120 has been augmented with an icon 122 to indicate that the second search result 120 has been augmented by the user-specific information. In the illustrated example, icon 122 comprises an image of a person sleeping on a bed, which may indicate to the user of consumer computing device(s) 104 that they were at the hotel previously, had stayed at the hotel previously, or have a future appointment at the hotel. Thus, the techniques described herein include augmenting ordered results 116 using user-specific information, which may in turn result in presenting ordered results 116 according to the intent of the user rather than all users of the mapping service(s) 102, and without sharing private information of the user.

In some examples, consumer computing device(s) 104 may communicate, via network(s) 106, with satellite(s) 108. Satellite(s) 108 may constantly, or intermittently, monitor the location consumer computing device(s) 104 any provide geographic locations for the consumer computing device(s) 104 at various locations, such as via a Global Positioning System. In some example, geographic coordinates may be determined by other methods, such as by cellular networks. In various examples, the user-specific information may have geographic coordinates associated with them. For example, in an example where a user takes a picture of a park, the park may have geographic coordinates associated with it, such as in metadata. In this way, the user-specific information may be associated with geographic coordinates used to augment the various ordered results 116. As an example, if the ordered results 116 include a park the user took a picture of, the location of the park may be elevated by analyzing the metadata of the picture and matching the geographic coordinates of the picture with the location of the park listed in the ordered results 116.

As described herein, consumer computing device(s) 104 may comprise any type of computing device configurable to augment search results using user-specific information. In some examples, consumer computing device(s) 104 may comprise laptop computers, tablet computers, wearable computers, implanted computing devices, telecommunication devices, automotive computers, autonomous vehicles, portable gaming devices, media players, cameras, or the like. Example embedded computers can include network enabled televisions, integrated components for inclusion in a computing device, appliances, microcontrollers, digital signal processors, or any other sort of processing device, or the like. In at least one example, the consumer computing device(s) 104 can include virtual reality or mixed reality devices (e.g., CANON® MREAL® System, MICROSOFT® HOLOLENS®, etc.). In some examples, consumer computing device(s) 104 may include multiple types of devices. For example, a mobile phone may be used in conjunction with a computing system of an automobile and work in conjunction to receive ordered results 116, augment the ordered results 116, and present the augmented results.

Figure 2:
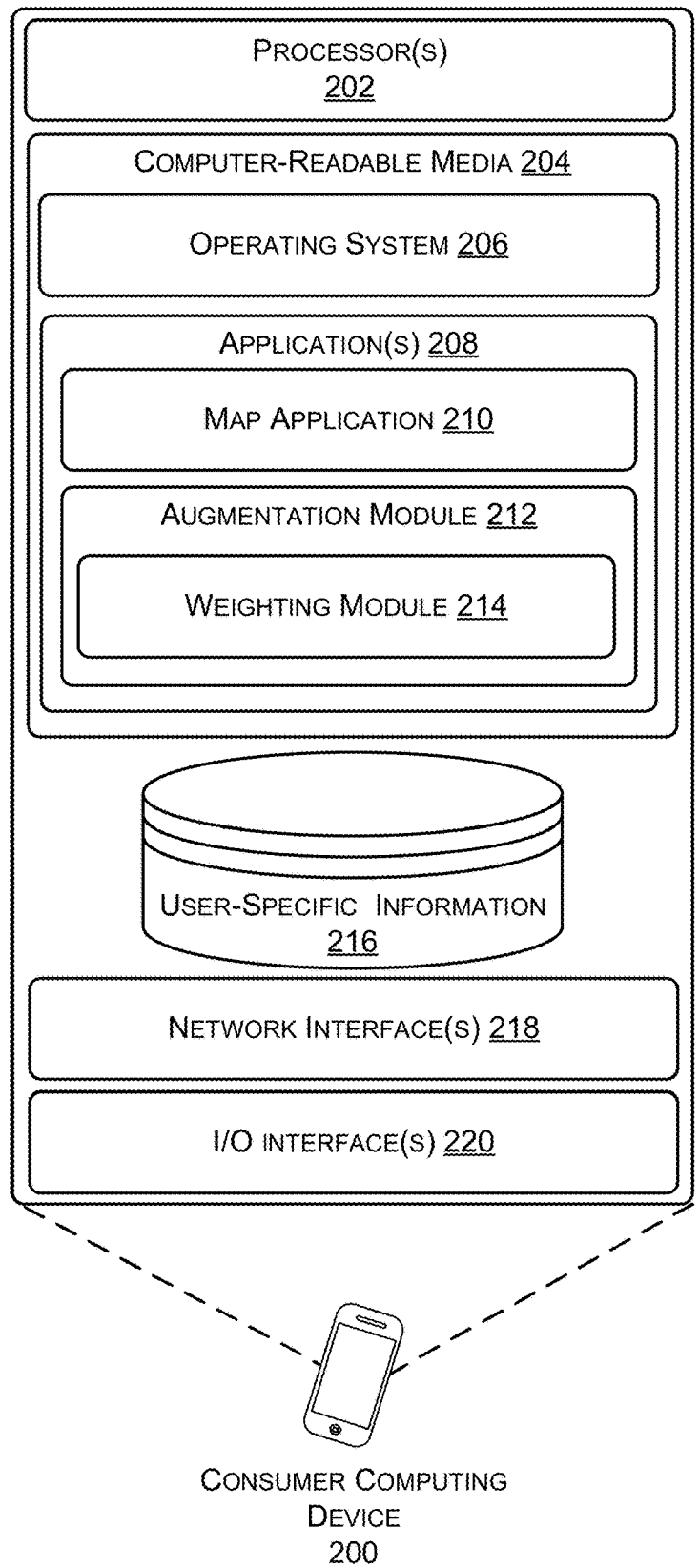
FIG. 2 is a schematic diagram showing an example consumer computing device for augmenting ordered search results.

FIG. 2 is a schematic diagram showing an example consumer computing device 200 for augmenting ordered search results. Consumer computing device 200 may comprise any type of computing device (i.e., consumer computing device(s) 104), or combination of computing devices, configured with one or more modules to augment ordered results based on user-specific information. Consumer computing device 200 may include one or more processors 202 (i.e., processing units) and computer-readable media 204. Computer-readable media 204 may be operably or communicatively connected to processor(s) 202, such as via a bus, which in some instances can include one or more of a system bus, a data bus, an address bus, a PCI bus, a Mini-PCI bus, and any variety of local, peripheral, and/or independent buses.

In at least one example, computer-readable media 204 can include components that facilitate augmenting of ordered search results based on user-specific information. For example, computer-readable media may include an operating system 206, one or more applications 208 including a map application 210 and an augmentation module 212. In some examples, mapping application 210 and augmentation module 212 may comprise computer-readable instructions configured to work in conjunction to perform the augmentation techniques described herein. For instance, map application 210 may present a user interface, such as user interface 110, configured to receive search queries and present ordered results. Augmentation module 212 may comprise instructions for augmenting ordered results based on user specific information. For example, augmentation module 212 may reorder the ordered results based on user-specific information, add locations to the search results based on user-specific information, and/or graphically represent (e.g., associate an icon and/or text with one or more of the results) one of the one or more locations included in the ordered results based on the user-specific information. In some examples, augmentation module 212 may further include a weighting module 214, configured to weight ordered search results by applying weighting factors to the various types of user specific information. In some examples, different weighting factors may be applied based on the type of information used to augment the search results, as described with greater detail in FIG. 3. Additionally, weighting module 214 may further reduce weighting factors, or "age out" weighting factors, based on an amount of time from when the user-specific information was stored, or based on an event date associated with the user-specific information (e.g., appointments in a calendar, previously visited locations, etc.). Although the map application 210, augmentation module 212, and weighting module 214 are illustrated as being part of application(s) 208 of the consumer computing device 200, in some examples all or part of these modules/components may be implemented in the operating system 206. For example, augmentation module 212 and weighting module 214 may be part of executable instructions of the operating system 206, and/or as various Application Programming Interfaces (APIs) of consumer computing device 200. Stated otherwise, map application 210, augmentation module 212, and weighting module 214 may be implemented entirely in application(s) 208, entirely in operating system 206, or a combination of both.

Computer-readable media 204 may further include user-specific information 216. User-specific information 216 may comprise any type of information usable to augment results at consumer computing device 200. For example, user-specific information 216 may include explicit/implicit indicators, calendar information, direction information, previous location information, email or text message information, and contact information. Further details of these types of information which will be described below with respect to FIG. 3. Augmentation module 212 and weighting module 214 may use the user-specific information 216 to augment ordered search results at the consumer computing device 200.

Consumer computing device 200 may further include one or more network interfaces 218 (i.e., communication connections) to send and receive data over a network. Network interface(s) can include one or more network interface controllers (NICs) or other types of transceiver devices to send and receive communications over a network, such as network(s) 106. For example, network interface(s) may send search queries over network(s) 106 to mapping service(s) 102. Additionally, network interface(s) 218 may receive ordered search results from mapping service(s) 102. In some examples, network interface(s) 218 may receive geographic coordinates from various entities, such as satellite(s) 108 and/or cellular networks.

Consumer computing device 200 may additionally include one or more input/output (I/O) interfaces 220 to allow consumer computing device 200 to communicate with other devices such as input peripheral devices (e.g., a keyboard, a mouse, a pen, a game controller, a voice input device, a touch input device, a gestural input device, a tracking device, a mapping device, a visual content item camera, a depth sensor, a physiological sensor, and the like) and/or output peripheral devices (e.g., a display, a printer, audio speakers, a haptic output, and the like).

Depending on the exact configuration and type of the consumer computing device 200, the computer-readable media 204 can include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media.

In some examples, processor(s) 202 can represent, for example, a CPU-type processing unit, a GPU-type processing unit, a HPU-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip systems (SOCs), Complex Programmable Logic Devices (CPLDs), etc. In various examples, the processor(s) 202 can execute one or more modules and/or processes to cause the consumer computing devices 200 to perform operations for augmenting search results. Additionally, each of the processor(s) 202 can possess its own local memory, which also can store program modules, program data, and/or one or more operating systems.

Figure 3:
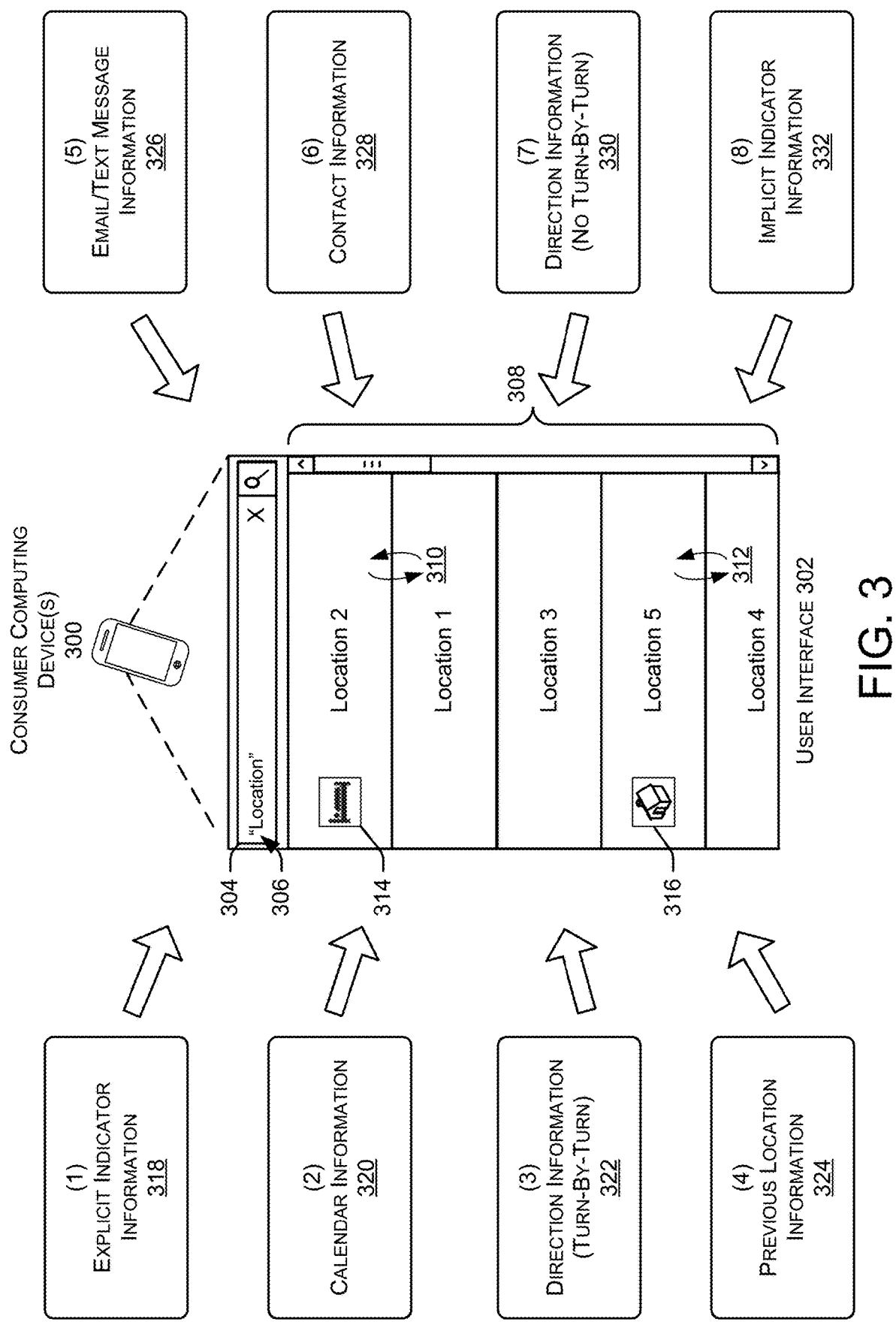
FIG. 3 is a schematic diagram of an example user interface for augmenting ordered search results based on user-specific information stored locally at a consumer computing device.

FIG. 3 is a schematic diagram of an example user interface 302 for augmenting ordered search results based on user-specific information stored locally at a consumer computing device(s) 300. Consumer computing device(s) 300 may comprise any type of computing device, such as consumer computing device(s) 104, or combination of computing devices, configured with one or more modules (i.e., operating system 206, map application 210, augmentation module 212, weighting module 214, etc.) to augment ordered search results based on user-specific information. Consumer computing device(s) 300 may present a user interface 302 on a display associated with the device. User interface 302 may include a search query box 304 to receive a search query 306, which may comprise a desired "location" input by a user of the consumer computing device(s) 300. The consumer computing device(s) 300 may send, by network interfaces and/or communication connections, the search query 306 to a mapping service located remotely from consumer computing device(s) 300. Further, consumer computing device(s) 300 may receive search results (i.e., locations) from the mapping service that are responsive to the search query. The search results may comprise ordered search results 308 presented on the user interface 302. The ordered search results 308 may be ordered, or ranked, based on information collected from all users of the mapping services.

In some examples, one or more types of user-specific information may be used to augment the ordered search results 308. For example, Location 2, which may have been the second highest ranked result received from the mapping service, may be reordered at 310 past Location 1 based on the user-specific information. Similarly, Location 5 may be reordered at 312 above Location 4 based on the user-specific information. In some examples, the user-specific information may be used to add search results to the ordered search results 308. For example, the ordered search results 308 may not have included Location 4 when they were received from the mapping service. However, based on user-specific information, such as the user of consumer computing device(s) 300 having been at Location 4 recently, Location 4 may have been added to the ordered search results 308. Thus, the ordered search results 308 may be augmented to include additional results that were not initially received in the list from the mapping service. In various examples, the user-specific information may further augment the ordered search results 308 by associating an icon, text, or other graphical indicator with one or more of the results. As shown in FIG. 3, a first icon 314 is associated with Location 2, and a second icon 316 may be associated with Location 5. In this way, a user of consumer computing device(s) 300 may be notified that a particular location having an icon is associated with user-specific information. For example, first icon 314 may indicate to a user that Location 2 is associated with a hotel the user has stayed at. Additionally, second icon 316 may indicate to a user that Location 5 is a location of a contact of theirs, or near a location of a contact of theirs. However, in other examples first icon 314 and second icon 316 may comprise any type of icon indicating user-specific information that is associated with the particular location. In various examples, augmenting the ordered search results 308 may include associating text with one or more of the results. The text may be presented in place of an icon, or in conjunction with an icon. For instance, a hotel that a user stayed at the previous month that is presented in the ordered search results 308 may have text associated with it such as "you stayed at this hotel last month."

In various examples, the user-specific information used to augment the ordered search results 308 may comprise explicit indicator information 318, calendar information 320, direction information (i.e., turn-by-turn information) 322, previous location information 324, email and/or text information 326, contact information 328, direction information (i.e., no turn-by-turn information) 330, and/or implicit indicator information 332. In some examples, one or more of these types of information may be used individually, or in conjunction, to augment ordered search results 308. For instance, a particular location may have a single type of information used to augment the location, and in other examples the particular location may have multiple types of information used to augment the location. Additionally, each location may have different types or combination of user-specific information used to augment the locations.

In some examples, explicit indicator information 318 may comprise information indicating that a user has explicitly expressed interest in a location. For example, explicit indicator information 318 may comprise a picture of a location taken by a user of consumer computing device(s) 300. As an example, a user may see a park they wish to visit later while riding on a bus, take a picture of the park, and add text to the picture indicating "park." In some examples, consumer computing device(s) 300 may automatically associate geographic coordinates (e.g., longitudinal and latitudinal coordinates, street addresses, etc.) received from a GPS, cellular network, or other positioning system with the picture. The geographic coordinates may be stored with or otherwise associated with the picture, such as in the picture metadata. When augmenting the search results, the picture may be identified as being a picture of a park and results returned from the mapping service may be augmented to reorder the location of the particular park to a higher rank or listing based on the explicit indication from the user. In a further example, the explicit indicator information 318 may include a verbal indication of a location during driving. For example, a user may verbally state "I would like to try that barbeque restaurant some time," and consumer computing device(s) 300 may store the verbal notation along with geographical coordinates of where the verbal notation was received. Using various technologies, such as speech-to-text technologies, the verbal notation may be analyzed and a barbeque restaurant near the geographic coordinates of the verbal notation may be elevated in the ordered search results 308 for a search query 306 for barbeque restaurants.

User-specific information may further include calendar information 320. In some examples, calendar information may comprise one or more calendar events stored in consumer computing device(s) 302 indicating past or future appointments of a user. For instance, calendar information 320 may be stored in a calendar application of consumer computing device(s) 302. The calendar information 320 may have locations associated with the events or appointments stored in the calendar. For instance, calendar information 320 may interpret text stating "Doctor's appointment at St. Martins Hospital" and identify a geographic location of a St. Martins Hospital. Using the geographic location of St. Martins Hospital for a search query of "doctor," a search result for a doctor located at St. Martins Hospital may be elevated in ordered search results 308, and/or graphically indicated in the ordered search results 308. In some examples, a location of a future appointment may be weighted more heavily than a location previous appointment, or vice-versa. For instance, a first location of a previous doctor's appointment may have a lesser weighting factor applied to it than a second location of a future doctor's appointment. Additionally, in some examples an amount of time until the appointment may cause the location of the doctor's appointment to have a higher or lower weighting factor applied to it. As an example, a first location of a doctor's appointment that is in a few hours may have a heavier weighting factor applied to it than a second location of a doctor's appointment that is a few months away.

In some examples, the user-specific information may further include direction information (turn-by-turn) 322. For instance, a location that a user has previously used turn-by-turn directions to navigate to may be augmented in orders search results 308. As an example, if a user had navigated to a particular rental car company a day ago, a list of ordered search results 308 responsive to "rental car" will augment a search results associated with the particular rental car company. Additionally, an amount of time between the current date and the date when the turn-by-turn directions were used may reduce or increase a weighting factor used to augment the particular search result associated with the location information. For example, if a user of the consumer computing device(s) 300 had used turn-by-turn directions to a particular location three years ago, that location may have its weighting factor reduced in comparison to a location that the user had navigated to a day ago.

In various examples, the user-specific information may further include previous location information 324, which may include locations that the consumer computing device(s) 300 has been at previously. For instance, a log of locations may be stored in memory of consumer computing device(s) 300 with associated geographic coordinates. In some examples, the locations may further have frequency information indicating a number of times the consumer computing device(s) 300 was at the locations and/or temporal information indicating lengths of times the consumer computing device(s) 300 was at the location. In some examples, the locations may be augmented using various weighting factors based on the temporal information and/or the frequency information. For instance, a location that the consumer computing device(s) 300 was at for a longer period of time may be weighed more heavily than a location the consumer computing device(s) 300 was at for a short period of time, or vice-versa. Additionally, if the consumer computing device(s) 300 was at a particular location a higher amount of times in a period of time than another location, the particular location may have a higher weighting factor applied to it compared to the other location when augmenting ordered search results 308. In various examples, previous locations may be weighted more heavily, or be kept for a longer time, based on the particular area associated with the locations. For example, if the consumer computing device(s) 300 is usually located in Washington State, then previous location information stored for when the consumer computing device(s) 300 is in another location may be kept longer and/or weighted more heavily. As an example, if a user was in Houston, Tex. two years ago, a previously stored location of a rental car company may be weighted heavily and/or be stored for a longer period of time as the user is not often in Houston and may wish to use the same rental car company.

User-specific information may further include email and/or text message information. For example, locations associated with an email or a text message stored in the consumer computing device(s) 300 may be augmented in ordered search results 308. In one example, an email may comprise an email from a hotel confirming reservations that the user still plans to stay at that hotel. In response to a search query 306 of "hotel," the particular location associated with the hotel in the email may be augmented in ordered search results 308. Similarly, if a text message received at the consumer computing device(s) 300 indicates a coffee shop location where the user of the consumer computing device(s) 300 is planning to meet someone, the particular coffee shop location may be augmented in the ordered search results 308 responsive to a search query 306 of "coffee shop." In various examples, the locations included in the email and/or text messages may be weighted more or less heavily when augmenting the location in the search results based on when the text or email was received. For instance, a location in an older email or text may be weighed less heavily than a location in a more recently received email or text.

In some examples, user-specific information may further include contact information 328. Contact information 328 may include locations associated with contacts of the consumer computing device(s) 300. For example, if a user inputs a search query 306 for a particular location, then a particular search result from ordered search results 308 may be augmented based on a contact address being located near or at the particular result. For instance, if a user of the consumer computing device(s) 300 is searching for a grocery store in an area, a particular grocery store near a location of a contact may be elevated as the user may wish to visit that particular contact, or is familiar with the area near the contact from previous visits. In some examples, contact information 328 may be used in conjunction with other information. As an example, a user may have an approaching appointment with a person named "Stacey" stored in calendar information 320 at a particular restaurant with multiple locations in a city. In response to receiving a search query 306 for the particular restaurant, the location of a contact named "Stacey" may be identified in the contact information 328 and a location of the particular restaurant most near the location of "Stacey" may be augmented in the search results.

In some examples, user-specific information used to augment ordered search results 308 may further include direction information with no turn-by-turn directions 330. For instance, direction information with no turn-by-turn direction 330 may include locations that have been previously presented to a user in a user interface, such as user interface 302, but not selected for turn-by-turn directions. For example, assume a user enters a search query 306 of "Italian Restaurants," and selects a single location from a list of ordered locations and navigates to that location using turn-by-turn directions. In a future instance where "Italian Restaurants" is used as a search query, other locations that were previously presented in the ordered locations, but not selected for turn-by-turn directions, may be augmented in the ordered search results 308. In this way, previously presented locations may be harnessed to augment search results that may be of interest to a user, but have not been previously selected for turn-by-turn directions. In some examples, the direction information with no turn-by-turn directions 330 may include a textual and/or graphical instructions to a location that a user has selected and/or viewed, but did not have turn-by-turn directions audibly or visually presented to them. For instance, a user may have viewed a list of textual directions to a location, but did not select an option to have those directions presented to them as turn-by-turn directions as they navigate the route.

In various examples, the user-specific information used to augment ordered search results 308 may include implicit indicator information 332. Implicit indicator information 332 may comprise information indicating a user has expressed interest in a particular location implicitly. As an example, the consumer computing device(s) 300 may comprise a computing device with gaze tracking abilities (e.g., autonomous vehicles, wearable glasses computing devices, etc.). Consumer computing device(s) 300 may identify, using the gaze tracking abilities, particular locations that a user has gazed at for threshold periods of time, or locations gazed at in combination with a verbal note. For example, consumer computing device(s) 300 may identify a Hawaiian restaurant when a user has gazed at the particular Hawaiian restaurant for a threshold period of time, and consumer computing device(s) 300 may associate geographical coordinates with the Hawaiian restaurant when the threshold period of time has been met (e.g., 5 seconds, 10 seconds, etc.). In another example, the user may be gazing at a particular location and verbally note the location, such as by stating "I wonder how that Hawaiian restaurant is?" Using this implicit indicator of an extended gaze and/or verbal note, consumer computing device(s) 300 may augment a location of a Hawaiian restaurant in ordered search results 308 responsive to a search query 306 of "Hawaiian restaurants" which has a location associated with the location of the implicitly indicated Hawaiian restaurant based on the implicit indicator information 332.

As shown in FIG. 3, each of the different types of user-specific information may be associated with higher or lower weighting factors. As an example, the eight types of information shown in FIG. 3 may be weighted with weighting factors according to the illustrated ranks 1-8 indicating the important of the particular type of information. For example, the number 1 ranked explicit indicator information 318 may have a heavier weighting factor applied to it than number 2 ranked calendar information 320, and so on for ranks 3-8 shown in FIG. 3. However, the illustrated ranks in FIG. 3 is merely one example of rankings, and it should be appreciated that any ranking number and weighting factor may be applied to the eight different types of user-specific information in various examples depending on what emphasis is desired for the particular types of user-specific information. Additionally, in some examples more than the eight illustrated types of information may be used, and these are merely illustrative types of information used to augment search results. In one example, previous user interaction with ordered search results 308 may be used to augment future search results. In such an example, a user may have previously re-requested search results to return more expensive or less expensive restaurants. This information may be used in future augmentation of ordered search results 308 to reorder or graphically indicate a restaurant that is more expensive or less expensive.

In some examples, various machine learning algorithms may be employed to refine the weights and/or decay rates over time or with use. For example, machine learning algorithms may identify which types of information used to augment search results most often result in their respective search results being selected, and adjust weighting factors and/or decay rates based on the selection. For instance, if the machine learning algorithms determine that search results augmented using previous location information 324 are selected more frequently compared to other types of user-specific information, the weighting factors applied to the search results augmented by previous location information 324 may be increased so those results are presented higher in the ordered search results 308 compared to the previous weighting factors. As another example, if the machine learning algorithms determine that locations augmented using calendar information 320 are less frequency selected compared to other types of the user-specific information, the weighting factors applied to calendar information 320 may be reduced. In some examples, if locations augmented by various types of the user-specific information are more often selected, the weighting factors may be less likely to be "aged out," or have their weights decayed less with time.

In various examples, the machine learning algorithms may be further trained or improved upon by identifying locations associated with stored user-specific information that are frequently selected, but that were not augmented based on that user-specific information. For example, if a user is at a particular restaurant a year ago, that location information may be saved locally at the consumer computing device, but not used to augment search results that include the location. If the machine learning algorithms observe or learn that the particular location is selected frequently without augmenting the location based on the stored user-specific information, the machine learning algorithms may update the weighting factors and/or decay rates associated with the type of user-specific information, such as being at a location previously. For instance, a decay rate for certain types of information may be lessened relative to other decay rates or previous decay rates based on results associated with that user-specific information, although not augmented based on it, being selected frequently.

Example Processes

The processes described in FIGS. 4 and 5 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations descried herein may, but need not be implemented using the consumer computing device 200. By way of example and not limitation, the processes 400 and 500 are described in the context of the architecture of FIG. 1 and consumer computing device(s) 200 of FIG. 2. For example, the operations may be performed by one or more of operating system 206, application(s) 208, map application 210, augmentation module 212, and/or weighting module 214.

Figure 4:
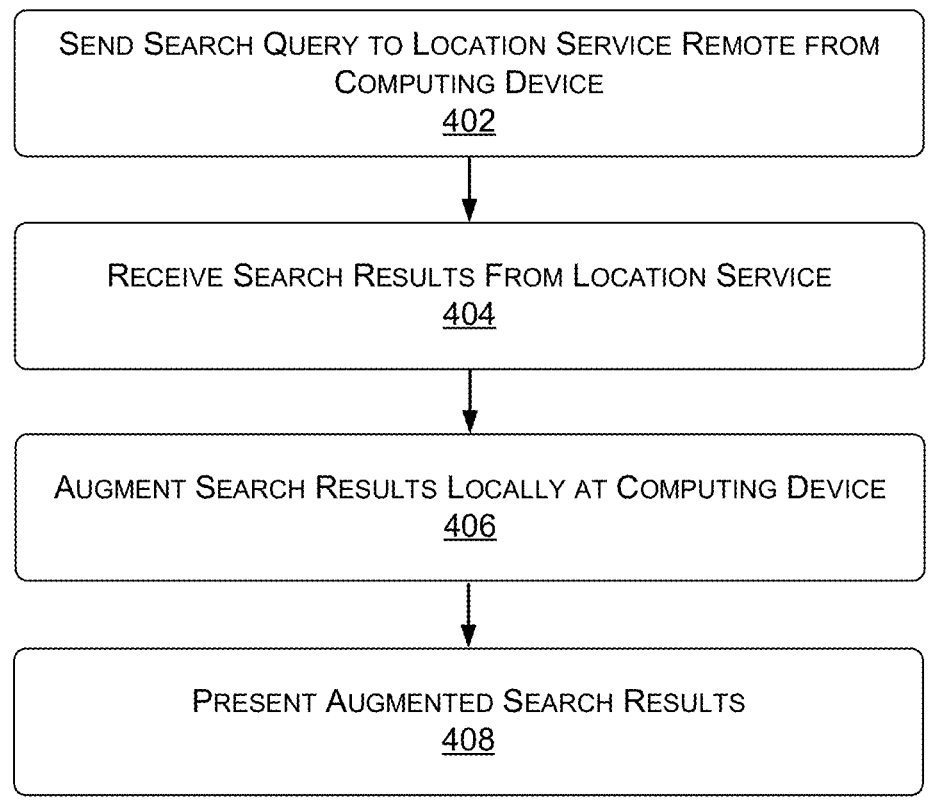
FIG. 4 is a flow diagram showing an example process for augmenting or modifying ordered search results based on various types of user-specific information.

FIG. 4 is a flow diagram showing an example process 400 for augmenting ordered search results based on various types of user-specific information.

At block 402, consumer computing device(s) 200 may send a search query to a location service, such as mapping service(s) 102, remote from the computing device. The search query may be received via a user interface of the consumer computing device(s) 200 and send using network interface(s) 218 over one or more networks.

At block 404, the consumer computing device(s) 200 may receive, via network interface(s) 218, the search results from the location service, such as mapping service(s) 102. The search results may include one or more locations responsive to the search query. In some examples, the search results may be ordered by the mapping service(s) 102 based on information obtained from users of the mapping service(s) 102.

At block 406, the augmentation module 212 may augment the search results locally at consumer computing device(s) 200 based at least in part on information stored in the memory, or storage medium, of the client computing device, such as user-specific information 216. In various examples, augmenting the search results comprises at least one of reordering one or more of the search results, or graphically indicating at least one of the one or more locations included in the search results. In various examples, the information may comprise one or more events associated with a particular location, and augmenting the search results may comprise determining a type of the user information, identifying, by weighting module 214, a weighting factor based at least in part on the type of the one or more events, identifying a particular time associated with the one or more events, reducing, by weighting module 214, the weighting factor based at least in part on an amount of time that has passed from the particular time, and applying, by weighting module 214, the reduced weighting factor to the particular location.

At block 408, the consumer computing device(s) 200 may present the augmented search on a display associated with the consumer computing device(s) 200, such as a display included in I/O interfaces 220. In some examples, presenting the augmented search results may comprise identifying a graphical indicator associated with at least one search result based at least in part on the information stored in the memory of the client computing device, and presenting, on the display, the graphical indicator associated with the at least one search result.

Figure 5:
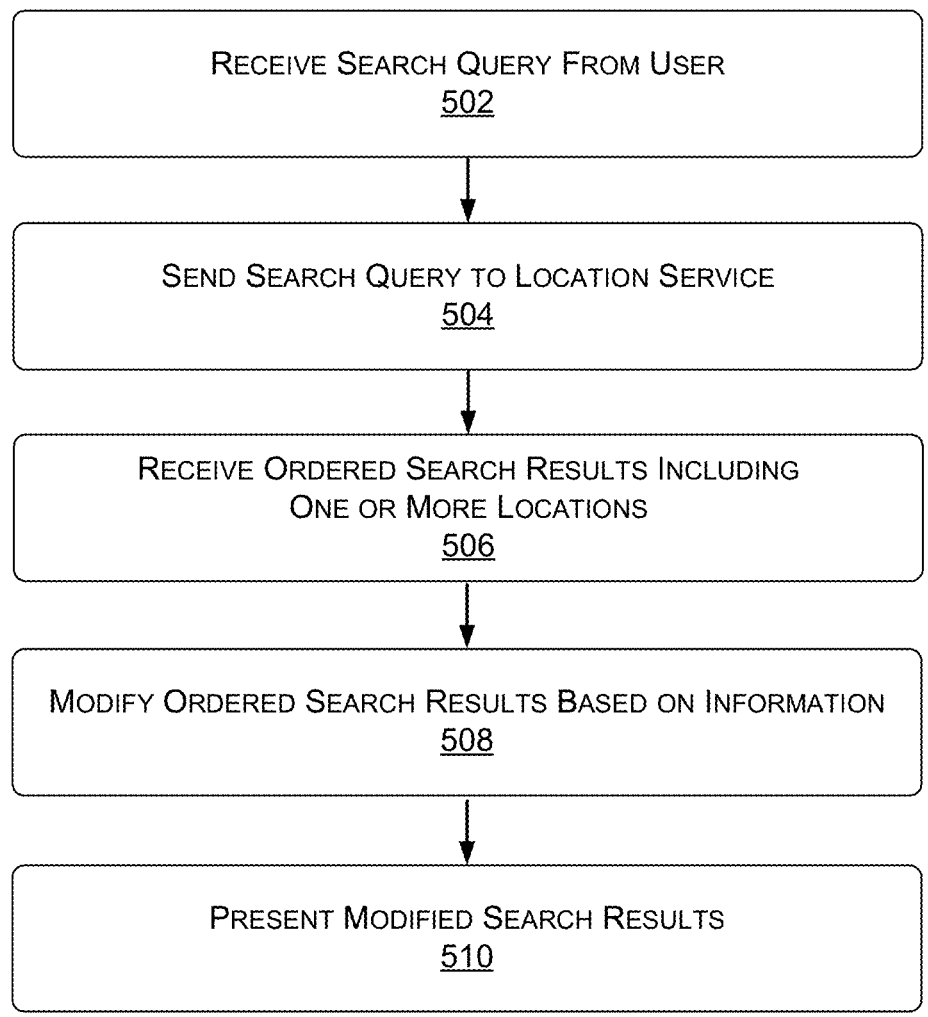
FIG. 5 is a flow diagram showing an example process for augmenting or modifying ordered search results based on various types of user-specific information.

FIG. 5 is a flow diagram showing an example process 500 for modifying ordered search results based on various types of user-specific information.

At block 502, a search query is received from a user. In some examples, the search query may be received via a user interface presented on a display associated with a system.

At block 504, the system may send the search query to a location service. The location service may be located remotely from the system.

At block 506, the system may receive ordered search results including one or more locations associated with, or responsive to, the search query. The ordered search results may be received from the location service located remotely from the system.

At block 508, the system may modify the search results based on information stored locally in memory of the system. In some examples, modifying the search results may comprise at least one of reordering at least one search result of the ordered search results; or graphically representing at least one of the one or more locations included in the ordered search results based at least in part on the information. In various examples, the information stored locally in the memory of the system comprises at least one of calendar information indicating locations of calendar events associated with the user; email information indicating locations contained in emails associated with the user; or text information indicating locations contained in text messages associated with the user. In such examples, modifying the search results may comprise identifying a particular search result from the ordered search results that is associated with a location of the locations indicated by at least one of the calendar information, email information, or text information; identifying weighting factors for each of the calendar information, email information, and text information; and weighting the particular search result based at least in part on weighting factors.

At block 510, the system may present the modified search results on a display associated with the system. In some examples, the system may present the reordered search results and/or a graphical representation associated with one or more locations of the ordered search results.

While the operations are described as being implemented by one or more computing devices, in other examples various systems of computing devices may be employed. For instance, a system of multiple devices may be used to perform any of the operations noted above in conjunction with each other. For example, a car with an internal computing device along with a mobile computing device may be employed in conjunction to perform these operations.

Example Clauses

A. A client computing device comprising: one or more processors; and memory communicatively coupled to the one or more processors and storing one or more modules that, when executed by the one or more processors, cause the client computing device to perform operations comprising: sending a search query to a search service remote from the client computing device; receiving, from the search service, search results including one or more locations responsive to the search query; augmenting the search results locally at the client computing device based at least in part on information stored in the memory of the client computing device to create augmented search results; and presenting the augmented search results on a display associated with the client computing device.

B. A client computing device as paragraph A recites, wherein augmenting the search results comprises at least one of: reordering one or more of the search results; or graphically or textually indicating at least one of the one or more locations included in the search results.

C. A client computing device as paragraph A or B recite, wherein presenting the augmented search results comprises: identifying at least one of a graphical indicator or a textual indicator associated with at least one search result based at least in part on the information stored in the memory of the client computing device; and presenting, on the display, at least one of the graphical indicator or the textual indicator associated with the at least one search result.

D. A client computing device as any of paragraphs A-C recite, wherein augmenting the search results comprises: identifying a particular search result from the search results corresponding to a location that a user of the client computing device has previously navigated to using turn-by-turn directions; and weighting the particular search result in the search results more heavily relative to others of the search results based at least in part on the client computing device having previously navigated to the location using the turn-by-turn directions.

E. A client computing device as any of paragraphs A-D recite, wherein the information stored in the memory of the client computing device comprises: location information indicating locations where the client computing device has been; temporal information indicating lengths of times at which the client computing device was at the locations; and frequency information indicating a number of times the client computing device was at the locations over a period of time.

F. A client computing device as paragraph E recites, wherein augmenting the search results comprises: identifying a particular search result from the search results that is associated with a location of the locations where the client computing device has been; and weighting the particular search result in the search results more heavily relative to others of the search results based at least in part on at least one of the temporal information indicating a length of time at which the client computing device was at the location or the frequency information indicating a number of times the client computing device was at the location over a period of time.

G. A client computing device as any of paragraphs A-F recite, wherein the information comprises one or more events associated with a particular location of the one or more locations; and wherein augmenting the search results locally at the client computing device based at least in part on the information comprises: determining a type of the one or more events; identifying a weighting factor based at least in part on the type of the one or more events; identifying a particular time associated with the one or more events; reducing the weighting factor based at least in part on an amount of time that has passed since the particular time; and applying the reduced weighting factor to the particular location.

H. A system comprising: one or more processors; and memory communicatively coupled to the one or more processors and storing one or more modules that, when executed by the one or more processors of the system, cause the system to perform operations comprising: receiving a search query via an input interface of the system; sending the search query to a search service located remotely from the system; receiving, from the search service, ordered search results including one or more locations associated with the search query; modifying the ordered search results locally at the system based at least in part on information stored locally in memory of the system to create modified search results; and presenting the modified search results on a display associated with the system.

I. A system as paragraph H recites, wherein modifying the ordered search results comprises at least one of: reordering at least one search result of the ordered search results; or graphically representing at least one of the one or more locations included in the ordered search results based at least in part on the information.

J. A system as paragraph H or I recite, wherein the information stored locally in the memory of the system comprises at least one of: calendar information indicating locations of calendar events; email information indicating locations contained in emails; or text information indicating locations contained in text messages.

K. A system as any of paragraphs H-J recite, wherein modifying the search results comprises: identifying a particular search result from the ordered search results that is associated with a location of the locations indicated by at least one of the calendar information, email information, or text information; identifying weighting factors for each of the calendar information, email information, and text information; and weighting the particular search result based at least in part on weighting factors.

L. A system as paragraph K recites, wherein a weighting factor for calendar appoint is larger than weighting factors for the email information and text information.

M. A system as paragraph K or L recite, wherein modifying the search results further comprises: identifying an age associated with the at least one of the calendar information, email information, or text information; and reducing at least one of the weighting factors based at least in part on the age.

N. A computer-implemented method comprising: sending, via communication connections of a computing device, a search query to a search service located remote from the computing device; receiving, via the communication connections, search results including a plurality of locations responsive to the search query; determining that the computing device has spent time at a location corresponding to a search result of the search results; augmenting, by one or more processors of the computing device, the search results locally at the computing device, the augmenting the search results comprising at least one of reordering the search result in a list of the search results or linking at least one of an icon or text to the search result that is associated with the search result; and presenting the augmented search results on a display associated with the computing device.

O. A computer-implemented method as paragraph N recites, wherein presenting the augmented search results comprises: identifying at least one of an icon or text associated with at least one search result; and presenting, on the display, at least one of the icon or the text with the at least one search result.

P. A computer-implemented method as paragraph N or O recite, the operations further comprising augmenting another search result of the search results based at least in part on at least one of explicit indicators or implicit indicators.

Q. A computer-implemented method as paragraph P recites, wherein the explicit indicators comprise at least one of: an image taken by the computing device and geographical coordinates associated with the image; or an audio indication received by the computing device and geographical coordinates associated with the audio indication.

R. A computer-implemented method as paragraph Q recites, wherein augmenting the search results locally at the computing device further comprises: identifying a particular search result of the search results associated with at least one of the geographical coordinates associated with the image or geographical coordinates associated with the audio indication; and weighting the particular search result in the search results more heavily relative to others of the search results based at least in part on the particular search result being associated with the at least one of the geographical coordinates associated with the image or geographical coordinates associated with the audio indication.

S. A computer-implemented method as paragraph R recites, wherein augmenting the search results further comprises: identifying at least one of a time at which the image was taken or a time at which the audio indication was received; and reducing the weighting of the particular search result based at least in part on at least one of the time at which the image was taken or the time at which the audio indication was received.

T. A computer-implemented method as any of paragraphs N-S recite, wherein the implicit indicators comprise at least one of: a gaze of a user of the computing device resting on a location for a threshold amount of time; or a gaze of the user resting on a location for a threshold amount of time in combination with an audio indication received by the computing device.

U. A computer-implemented method comprising: means for sending, via communication connections of a computing device, a search query to a search service located remote from the computing device; means for receiving, via the communication connections, search results including a plurality of locations responsive to the search query; means for determining that the computing device has spent time at a location corresponding to a search result of the search results; means for augmenting, by one or more processors of the computing device, the search results locally at the computing device, the augmenting the search results comprising at least one of reordering the search result in a list of the search results or linking at least one of an icon or text to the search result that is associated with the search result; and means for presenting the augmented search results on a display associated with the computing device.

V. A computer-implemented method as paragraph U recites, wherein presenting the augmented search results comprises: means for identifying at least one of an icon or text associated with at least one search result; and means for presenting, on the display, at least one of the icon or the text with the at least one search result.

W. A computer-implemented method of paragraph U or V, the operations further comprising means for augmenting another search result of the search results based at least in part on at least one of explicit indicators or implicit indicators.

X. A computer-implemented method as paragraph W recites, wherein the explicit indicators comprise at least one of: an image taken by the computing device and geographical coordinates associated with the image; or an audio indication received by the computing device and geographical coordinates associated with the audio indication.

Y. A computer-implemented method as paragraph X recites, wherein augmenting the search results locally at the computing device further comprises: means for identifying a particular search result of the search results associated with at least one of the geographical coordinates associated with the image or geographical coordinates associated with the audio indication; and means for weighting the particular search result in the search results more heavily relative to others of the search results based at least in part on the particular search result being associated with the at least one of the geographical coordinates associated with the image or geographical coordinates associated with the audio indication.

Z. A computer-implemented method as paragraph Y recites, wherein augmenting the search results further comprises: means for identifying at least one of a time at which the image was taken or a time at which the audio indication was received; and means for reducing the weighting of the particular search result based at least in part on at least one of the time at which the image was taken or the time at which the audio indication was received.

AA. A computer-implemented method as any of paragraphs U-Z recite, wherein the implicit indicators comprise at least one of: a gaze of a user of the computing device resting on a location for a threshold amount of time; or a gaze of the user resting on a location for a threshold amount of time in combination with an audio indication received by the computing device.

AB. One or more computer-readable media encoded with instructions that, when executed by one or more processors, configure a computing device to perform a computer-implemented method as any of paragraphs N-T recite.

AC. A device comprising one or more processors and one or more computer-readable media encoded with instructions that, when executed by the one or more processors, configure a computer to perform a computer-implemented method as any of paragraphs N-T recite.

CONCLUSION

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

As described above, while the disclosure describes classifiers that use decision forests, many of the techniques described herein can be performed using other classification or regression algorithms, such as neural networks, deep learning neural networks, adaptive boosting, or any other classification or regression algorithm.

What is claimed is:

1. A client computing device comprising:
one or more processors; and
memory communicatively coupled with the one or more processors and storing one or more modules that, when executed by the one or more processors, cause the client computing device to perform operations comprising:
sending a search query to a search service remote from the client computing device;
receiving, from the search service in response to the search query, search results ranked according to a first ranked order;
determining to augment the search results based on locally-stored user information in the memory, the locally-stored user information comprising:
explicit interest indicator information including a user-input interest indicator associated with one or more of the search results; and
implicit interest indicator information including an identified interest indicator associated with the one or more of the search results;
applying a weighting factor to the search results based on the locally-stored user information to generate a second ranked order for the search results, wherein the weighting factor is based on temporal information and/or frequency information corresponding to a location;
reordering the search results based on the locally-stored user information according to the second ranked order different from the first ranked order to generate augmented search results; and
presenting the augmented search results on a display associated with the client computing device.

2. The client computing device of claim 1, wherein:
the locally-stored user information further comprises turn-by-turn location information indicating one or more locations previously provided by the client computing device for one or more previous searches that received turn-by-turn directions; and
the operations further comprise:
identifying a particular search result from the search results located near or at the turn-by-turn information; and
reordering the search results further based on the particular search result.

3. The client computing device of claim 1, wherein:
the locally-stored user information further comprises unselected location information indicating one or more locations previously presented by the client computing device for one or more previous searches but unselected for turn-by-turn directions by the client computing device; and
the operations further comprise:
identifying a particular search result from the search results located near or at the unselected location information; and
reordering the search results further based on the particular search result.

4. The client computing device of claim 1, wherein:
the locally-stored user information further comprises contact location information indicating one or more locations associated with one or more contacts stored on the memory of the client computing device; and
the operations further comprise:
identifying a particular search result from the search results located near or at the contact location information; and
reordering the search results further based on the particular search result.

5. The client computing device of claim 1, wherein:
the locally-stored user information further comprises message-based location information indicating one or more locations associated with one or more messages including an email message or a text message stored on the memory of the client computing device; and
the operations further comprise:
identifying a particular search result from the search results located near or at the message-based location information; and
reordering the search results further based on the particular search result.

6. The client computing device of claim 1, wherein presenting the augmented search results comprises:
identifying at least one of a graphical indicator or a textual indicator associated with at least one search result of the search results based at least in part on the locally-stored user information; and
presenting, on the display, at least one of the graphical indicator or the textual indicator associated with the at least one search result.

7. A system comprising:
one or more processors; and
memory communicatively coupled to the one or more processors and storing one or more modules that, when executed by the one or more processors of the system, cause the system to perform operations comprising:
sending a search query to a search service located remotely from the system;
receiving, from the search service in response to the search query, search results ranked according to a first ranked order;
determining to augment the search results based on historic locally-stored user information in the memory, the locally-stored user information comprising:
explicit interest indicator information including a user-input interest indicator associated with one or more of the search results;
implicit interest indicator information including an identified interest indicator associated with the one or more of the search results; and turn-by-turn location information indicating one or more locations previously provided by the system for one or more previous searches that received turn-by-turn directions;
identifying a particular search result from the search results located near or at the turn-by-turn information;
reordering the search results, based on the locally-stored user information and identifying the particular search result, according to a second ranked order different from the first ranked order to generate augmented search results; and
presenting the augmented search results on a display associated with the system.

8. The system of claim 7, wherein the operations further comprise
applying a weighting factor to the search results based on the locally-stored user information to generate the second ranked order for the search results.

9. The system of claim 7, wherein:
the locally-stored user information further comprises unselected location information indicating one or more locations previously presented by the system for one or more previous searches but unselected for turn-by-turn directions by the system; and
the operations further comprise:
identifying a particular search result from the search results located near or at the unselected location information; and
reordering the search results further based on the particular search result.

10. The system of claim 7, wherein:
the locally-stored user information further comprises contact location information indicating one or more locations associated with one or more contacts stored on the memory of the system; and
the operations further comprise:
identifying a particular search result from the search results located near or at the contact location information; and
reordering the search results further based on the particular search result.

11. The system of claim 7, wherein:
the locally-stored user information further comprises message-based location information indicating one or more locations associated with one or more messages including an email message or a text message stored on the memory of the system; and
the operations further comprise:
identifying a particular search result from the search results located near or at the message-based location information; and
reordering the search results further based on the particular search result.

12. The system of claim 7, wherein the presenting the augmented search results comprises:
identifying at least one of a graphical indicator or a textual indicator associated with at least one search result of the search results based at least in part on the locally-stored user information; and
presenting, on the display, at least one of the graphical indicator or the textual indicator associated with the search results.

13. A computer-implemented method by a client computing device, comprising:
sending a search query to a search service remote from the client computing device;
receiving, from the search service in response to the search query, search results ranked according to a first ranked order;
determining to augment the search results based on locally-stored user information stored in memory of the client computing device, the locally-stored user information comprising:
explicit interest indicator information including a user-input interest indicator associated with one or more of the search results; and
implicit interest indicator information including an identified interest indicator associated with the one or more of the search results;
applying a weighting factor to the search results based on the locally-stored user information to generate a second ranked order for the search results, wherein the weighting factor is based on temporal information and/or frequency information corresponding to a location;
reordering the search results based on the locally-stored user information according to the second ranked order different from the first ranked order to generate augmented search results; and
presenting the augmented search results on a display associated with the client computing device.

14. The computer-implemented method of claim 13, wherein:
the locally-stored user information further comprises turn-by-turn location information indicating one or more locations previously provided by the client computing device for one or more previous searches that received turn-by-turn directions; and
the computer-implemented method further comprises:
identifying a particular search result from the search results located near or at the turn-by-turn information; and
reordering the search results further based on the particular search result.

15. The computer-implemented method of claim 13, wherein:
the locally-stored user information further comprises unselected location information indicating one or more locations previously presented by the client computing device for one or more previous searches but unselected for turn-by-turn directions by the client computing device; and
the computer-implemented method further comprises:
identifying a particular search result from the search results located near or at the unselected location information; and
reordering the search results further based on the particular search result.

16. The computer-implemented method of claim 13, wherein:
the locally-stored user information further comprises contact location information indicating one or more locations associated with one or more contacts stored on the memory of the client computing device; and
the computer-implemented method further comprises:
identifying a particular search result from the search results located near or at the contact location information; and
reordering the search results further based on the particular search result.

17. The computer-implemented method of claim 13, wherein:
the locally-stored user information further comprises message-based location information indicating one or more locations associated with one or more messages including an email message or a text message stored on the memory of the client computing device; and the computer-implemented method further comprises:
  identifying a particular search result from the search results located near or at the message-based location information; and
  reordering the search results further based on the particular search result.

* * * * *